(12) United States Patent
Niemann et al.

(10) Patent No.: US 11,476,672 B2
(45) Date of Patent: Oct. 18, 2022

(54) SYSTEM AND METHOD FOR STABILIZING AN ALTERNATING VOLTAGE GRID

(71) Applicant: Siemens Energy Global GmbH & Co. KG, Munich (DE)

(72) Inventors: Bernd Niemann, Erlangen (DE); Georg Pilz, Poxdorf (DE); Ralph Morgenstern, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 42 days.

(21) Appl. No.: 16/607,936

(22) PCT Filed: Mar. 28, 2018

(86) PCT No.: PCT/EP2018/057848
§ 371 (c)(1),
(2) Date: Oct. 24, 2019

(87) PCT Pub. No.: WO2018/197140
PCT Pub. Date: Nov. 1, 2018

(65) Prior Publication Data
US 2021/0098989 A1 Apr. 1, 2021

(30) Foreign Application Priority Data

Apr. 27, 2017 (DE) .................... 10 2017 207 133.8

(51) Int. Cl.
*H02J 1/00* (2006.01)
*H02J 3/00* (2006.01)
*H02J 3/18* (2006.01)
*H02J 3/24* (2006.01)

(52) U.S. Cl.
CPC .............. *H02J 3/1842* (2013.01); *H02J 3/24* (2013.01)

(58) Field of Classification Search
CPC .................................. H02J 3/1842; H02J 3/24
USPC ............................................................ 307/82
See application file for complete search history.

(56) References Cited

U.S. PATENT DOCUMENTS

| | | | |
|---|---|---|---|
| 4,199,804 A | 4/1980 | Juhlin | |
| 5,532,575 A | 7/1996 | Ainsworth et al. | |
| 2005/0015182 A1 | 1/2005 | Bebic et al. | |
| 2005/0194944 A1* | 9/2005 | Folts | H02J 3/1828 323/209 |
| 2008/0278121 A1 | 11/2008 | Herold et al. | |
| 2011/0115301 A1* | 5/2011 | Bhavaraju | H02J 3/38 307/86 |

(Continued)

FOREIGN PATENT DOCUMENTS

| | | |
|---|---|---|
| CN | 205544288 U | 8/2016 |
| DE | 1563995 A1 | 9/1970 |

(Continued)

*Primary Examiner* — Richard Tan
(74) *Attorney, Agent, or Firm* — Laurence A. Greenberg; Werner H. Stemer; Ralph E. Locher

(57) ABSTRACT

A system for stabilizing an alternating voltage grid has an inverter, which can be connected to the alternating voltage grid, and is configured to exchange reactive power with the alternating voltage grid. The system further has an inductor arrangement with variable inductor coils, which can be connected to the alternating voltage grid, and a control device, which is configured to control a reactive power in the alternating voltage grid by use of the inverter and by use of the inductor arrangement.

11 Claims, 3 Drawing Sheets

(56) References Cited

U.S. PATENT DOCUMENTS

| | | |
|---|---|---|
| 2012/0069612 A1 | 3/2012 | Hasler |
| 2013/0002211 A1 | 1/2013 | Egedal et al. |
| 2013/0207623 A1 | 8/2013 | Wong |
| 2014/0056041 A1* | 2/2014 | Zhu .................... H02M 3/1584 363/56.01 |
| 2016/0139578 A1 | 5/2016 | Hassler et al. |
| 2017/0250540 A1* | 8/2017 | Varma ....................... H02J 3/50 |

FOREIGN PATENT DOCUMENTS

| | | |
|---|---|---|
| DE | 2812259 A1 | 10/1978 |
| GB | 1174166 A | 12/1969 |
| WO | WO 2010115471 A1 | 10/2010 |

\* cited by examiner

SYSTEM AND METHOD FOR STABILIZING AN ALTERNATING VOLTAGE GRID

BACKGROUND OF THE INVENTION

Field of the Invention

The invention relates to a system for stabilizing an alternating voltage grid, having a converter that can be connected to the alternating voltage grid and is configured to exchange reactive power with the AC voltage grid.

Such a system is known from WO 2010/115471 A1. The known system is usually used to stabilize the AC voltage grid, wherein voltage fluctuations in the AC voltage grid are reduced, reactive power is exchanged with the AC voltage grid and disruptions in the AC voltage grid are minimized.

The converter of the known system is a so-called modular multilevel converter. It has a multiplicity of converter arms, wherein the converter arms can be connected to each other in a delta or a star topology, for example. Each converter arm comprises a series circuit of a plurality of two-pole switching modules. Each switching module comprises a plurality of semiconductor switches, as well as a DC link capacitor, which are connected to each other in a full-bridge circuit known to the person skilled in the art.

Such a converter is often referred to as a STATCOM (Static Synchronous Compensator). The semiconductor switches of the switching modules of the STATCOM can be controlled independently of one another, which means the STATCOM can generate a step-shaped alternating voltage with virtually any temporal profile.

A disadvantage of the known system is the relatively high operating costs.

SUMMARY OF THE INVENTION

The object of the invention is to propose a system of this type which is as efficient and cost-effective as possible.

The object is achieved according to the invention by a system in accordance with the independent patent claim. Therefore, the system also comprises an inductor arrangement with variable inductor coils, which can be connected to the AC voltage grid, and a control device which is configured to control a reactive power in the AC voltage grid by means of the converter and by means of the inductor arrangement. The inductor arrangement forms a so-called VSR (variable shunt reactor). This can affect the reactive power when connected to the AC voltage grid. The variable inductors can be, for example, inductors, the inductance level of which is variably adjustable by means of a step switch. Each of the inductors can be equipped with an iron core and/or an air gap.

The system thus combines the converter, which is relatively expensive to operate, with a relatively inexpensive inductor arrangement, in such a way that by means of a common control device this can be deployed as efficiently as possible to stabilize the alternating voltage grid. The converter only needs to be designed for a lower power range than is the case for the system known from the prior art. This lowers the cost of the system further.

Depending on appropriate regulatory requirements, the control device is capable of either controlling a reactive power in the AC voltage grid and suppressing voltage fluctuations in the AC voltage grid using the inductor arrangement or the converter.

The control device is advantageously configured for controlling the reactive power by means of the converter and the inductor arrangement, in such a way that during transient voltage fluctuations in the AC voltage network the reactive power can be controlled by means of the converter, and in a stationary operating region of the alternating voltage grid by means of the inductor arrangement. Since the converter can react very quickly and flexibly to rapid voltage fluctuations in the AC voltage grid, its use in these cases is particularly effective. Transient voltage fluctuations are those that occur within a few seconds. In particular, by means of the converter, transient under- or overvoltages in the time scale from 2 to 3 grid periods can be compensated. Due to delays in switching of, for example, mechanical step switches and the like, variable inductors are not suitable for a reactive power control on such short time scales. On a time scale of more than one minute, in this context a stationary state would already be assumed to exist. In the steady state therefore, the inductor arrangement can perform the stabilization of the AC voltage grid. In this way, a particularly large cost advantage can be achieved with high performance of the system.

According to one embodiment of the invention, the control device is configured for controlling the converter in such a way that switching voltage fluctuations arising in the AC voltage network as a result of switching operations of the inductor arrangement can be at least partially compensated by means of the converter. In this way, a particularly large advantageous synergy effect of the system can be achieved: the reliability of the system is increased due to the fact that the stabilization properties of the inductor arrangement are improved by means of the converter. The switching voltage fluctuations can occur, for example, by switching of the step switch, because each step-wise change in the inductance of the inductor arrangement produces a voltage fluctuation in the alternating voltage grid as a system response. These switching voltage fluctuations are generally undesirable.

The inductor arrangement preferably comprises variable inductors that are interconnected to form an isolated star point, wherein each of the inductors at its opposite end to the star point is electrically connected to a switching unit, by means of which the inductor can be connected to a phase of the AC voltage network associated thereto. Each of the variable inductors can be built up from a series connection of individual inductors. The number of the variable inductors therefore corresponds in a suitable way to the number of phases of the AC voltage grid.

According to one embodiment of the invention, the inductor arrangement and the converter can be connected to the alternating voltage grid by means of a common switching arrangement. In this way, a particularly simple and cost-effective connection of the system to the AC voltage grid can be implemented.

According to one embodiment of the invention, the inductor arrangement and the converter can each be connected to the alternating voltage grid by means of separate switching arrangements. Since the inductor arrangement and the converter in accordance with this embodiment can be connected to or disconnected from the AC voltage grid separately and independently of each other, in this case this results in a particularly high degree of flexibility in the operation of the system.

Preferably, the converter is a modular multilevel converter. In this way, the previously described STATCOM is provided, which can ensure an exceptionally flexible reactive power compensation in the AC voltage grid.

The inductor arrangement is preferably designed for a power range between +−100 Mvar (Mega Volt Ampere) and +−300 Mvar. With this design, by means of the inductor arrangement an alternating voltage grid with voltages in excess of 100 kV (e.g. phase to phase) can also be stabilized.

Preferably, the converter is designed for a power range between +−10 Mvar to +−400 Mvar. This means that the converter is adequately designed for reactive power compensation in high-voltage grids.

The invention also relates to a method for stabilizing an AC voltage grid by means of a system having a converter, which can be connected to the AC voltage grid.

Such a method is known, for example from the previously cited document WO 2010/115471 A1.

The object of the invention is to specify such a method which is as inexpensive and reliable as possible.

The object is achieved according to the invention by a method of the appropriate type by the fact that the system also comprises an inductor arrangement with variable inductor coils, which can be connected to the AC voltage grid, wherein by means of a control device a reactive power in the AC voltage grid is controlled by means of the converter and by means of the inductor arrangement.

The advantages of the method according to the invention result mutatis mutandis from the advantages already described in connection with the system according to the invention.

Preferably, during transient voltage fluctuations in the AC voltage grid the reactive power is controlled by means of the converter, and in a stationary operating region of the AC voltage grid by means of the inductor arrangement. In particular, in the stationary operating region the converter can revert back to the operating point 0 Mvar, which advantageously reduces the operating costs of the system.

The converter is particularly preferably controlled by means of the control device in such a way that switching voltage fluctuations, which arise in the alternating voltage grid as a result of switching operations of the inductor arrangement, are at least partially compensated by means of the converter.

All previously described preferred features of the system according to the invention can of course also be implemented alone or in combination in conjunction with the method according to the invention.

The invention will be explained in the following on the basis of exemplary embodiments which are illustrated in FIGS. 1 to 3.

DESCRIPTION OF THE INVENTION

Figure 1:
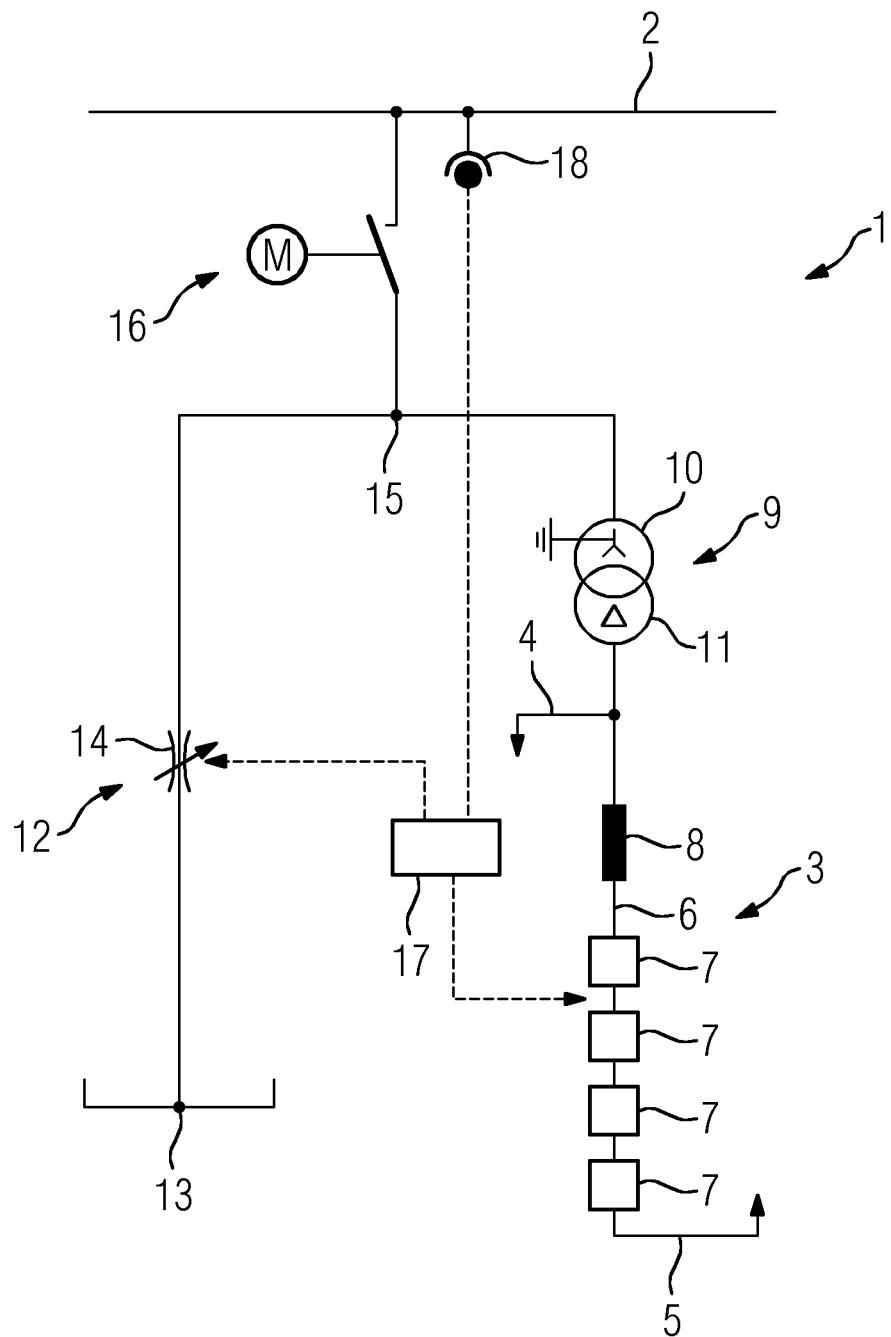
FIG. 1 shows a first exemplary embodiment of a system according to the invention in a schematic representation.

FIG. 1 shows, in a so-called single-line diagram, a system 1 for stabilizing an alternating voltage grid 2. The AC voltage grid 2 in the example shown is an energy supply grid with a voltage of 400 kV and a frequency of 50 Hz.

The system 1 comprises a converter 3. The converter 3 comprises three converter arms that are connected to each other in a delta connection, which is indicated by means of arrows 4 and 5. In the single-line diagram of FIG. 1 only the first converter arm 6 is illustrated. The other two converter arms of the converter 3 are designed in the same way as the first converter arm 6. The first converter arm 6 has a series connection of two-pole switching modules 7 and an arm inductance 8. The structure of the switching modules 7 will be discussed in more detail in the following FIG. 3. The converter 3 is connected to the AC voltage grid 2 via a transformer 9. A grid-side winding 10 of the transformer 9 is implemented in a grounded star winding, corresponding to a converter-side winding 11 of the transformer in a delta winding. The converter therefore forms a STATCOM and in the example shown is therefore designed for a power of +−50 Mvar.

The system 1 also comprises an inductor arrangement 12, which comprises three variable inductors, which are connected to each other to form a star point 13. The connection of the star point to the ground potential can be isolated (i.e. not grounded), direct (without an impedance) or else, for example, via an impedance. In the diagram of FIG. 1 only a first variable inductor 14 of the three similar inductors of the inductor arrangement 12 is drawn. The inductor arrangement 12 is configured for a reactive power exchange with the alternating voltage grid 2 in a power range of 200 Mvar. The first inductor 14 is connected on its side facing away from the star point 13 to a potential point 15, and via the potential point 15 to a switching device 16. The same applies also to the other two inductors of the inductor arrangement 12. Also, the grid-side winding 10 of the transformer 9 is connected to the potential point 15. The control of the inductors is carried out by controlling an appropriately controllable step switch.

The system 1 also comprises a control device 17. The control device 17 is configured for controlling the semiconductor switches of the converter 3 and the variable inductors. The control device 17 is connected to a measuring device 18 for measuring voltage and/or current in the AC voltage grid 2. Therefore, by means of the control device a reactive power in the AC voltage grid 2 can be controlled. To do so, the control device 17 controls the inductor arrangement 12 and the converter 3 according to a suitable control algorithm. The reactive power is controlled by means of the converter 3, in particular in the event of transient voltage fluctuations in the AC voltage grid 2. Otherwise, the reactive power is controlled by means of the inductor arrangement 12.

If switching voltage fluctuations occur in the AC voltage grid 2 as a result of switching operations in the variable inductors of the inductor arrangement 12, these are at least partially compensated by means of the converter 3, which is ensured by the control device by means of appropriate control of the switching modules 7 or of the semiconductor switches of the switching modules 7.

Figure 2:
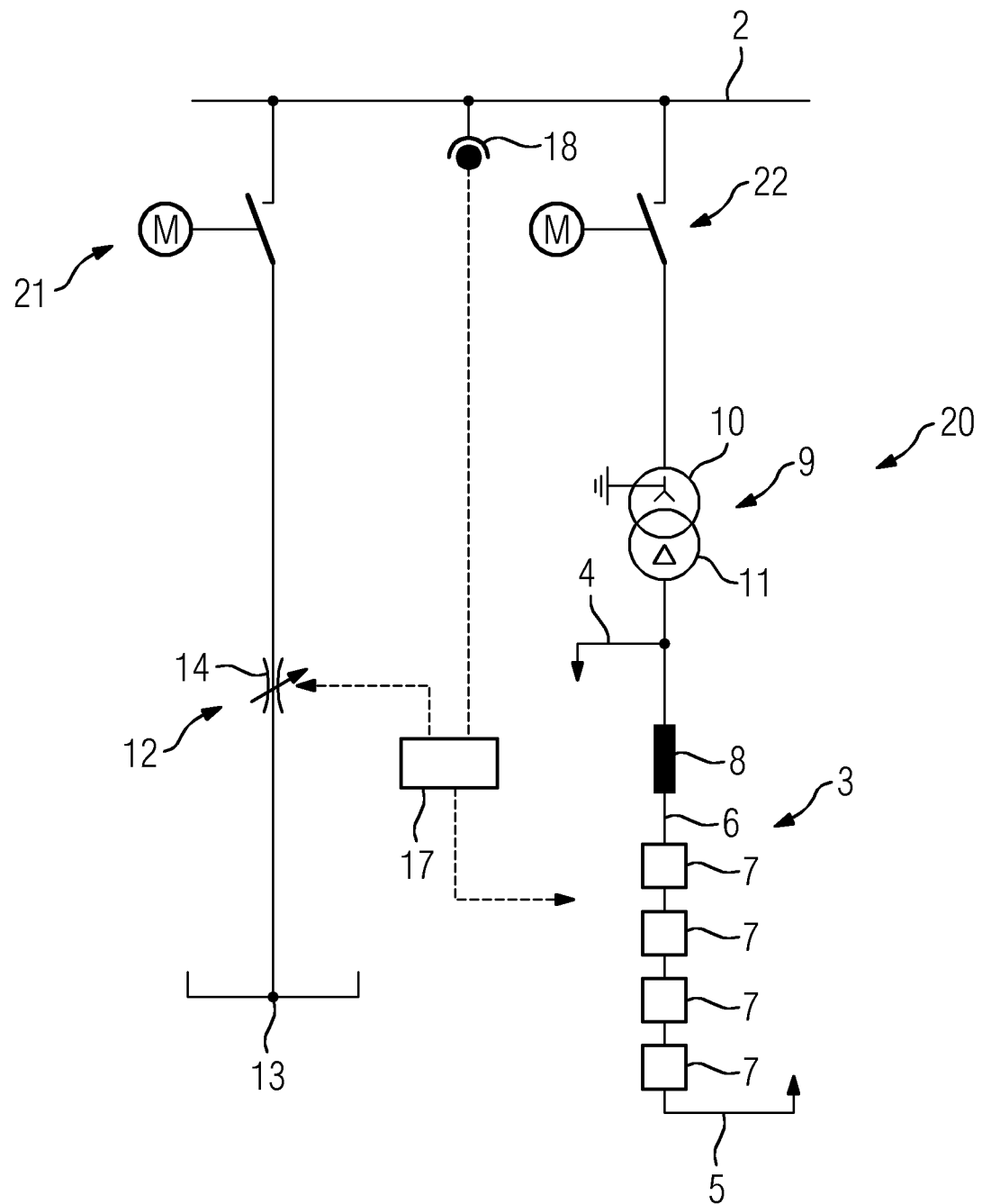
FIG. 2 shows a second exemplary embodiment of the system according to the invention in a schematic representation.

FIG. 2 shows a further system 20 for stabilizing an AC voltage grid. The system 20 and the system 1 of FIG. 1 are largely identical in structure. For reasons of transparency therefore, identical and equivalent elements in FIGS. 1 and 2 are labelled with the same reference symbol. To avoid repetitions, only the differences between the systems 1 and 20 will be discussed in the following.

In contrast to the system 1 of FIG. 1 the inductor arrangement 12 of the system 20 is connected to the alternating voltage grid 2 via a separate switching arrangement 21. Likewise, the converter 3 is connected to the alternating voltage grid 2 via a separate switching arrangement 22. Such an arrangement allows a greater flexibility in the operation of the system 20. The switching arrangements comprise switching elements associated with the phases of the AC voltage grid.

Figure 3:
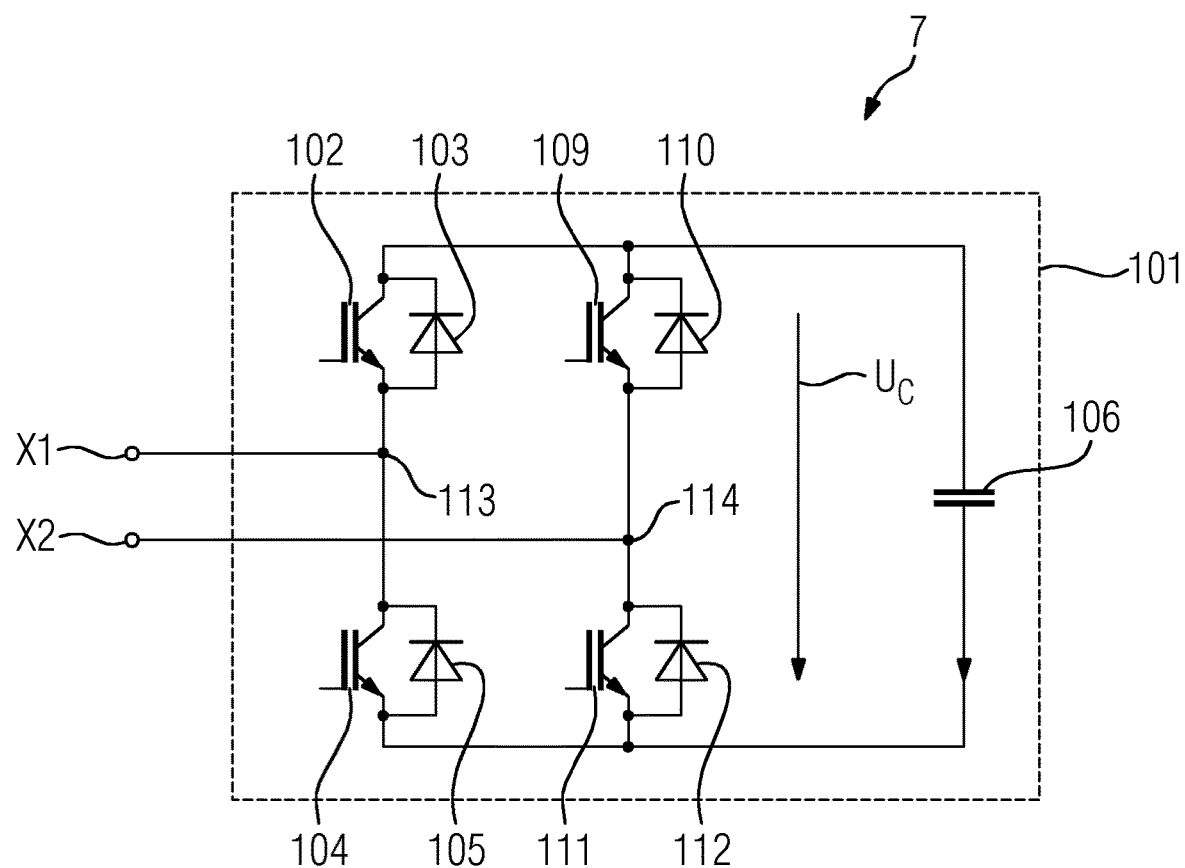
FIG. 3 shows an example of a switching module of a converter for one of the systems of FIGS. 1 and 2.

An example of a switching module 7 in the form of a full bridge circuit 101 is shown schematically in FIG. 3. The full bridge circuit 101 has a first semiconductor switch 102 in the form of an IGBT, with which a freewheeling diode 103 is connected in anti-parallel, as well as a second semiconductor switch 104 in the form of an IGBT, with which a freewheeling diode 105 is connected in anti-parallel. The forward direction of the two semiconductor switches 102 and 104 is rectified. The full bridge circuit 101 also comprises a third semiconductor switch 109 in the form of an IGBT, with which a freewheeling diode 110 is connected in anti-parallel, as well as a fourth semiconductor switch 111 in the form of an IGBT, with which a freewheeling diode 112 is connected in anti-parallel. The forward direction of the two semiconductor switches 109 and 111 is rectified. The semiconductor switches 102 and 104 with freewheeling diodes 103, 105 associated therewith thus form a series circuit, which is connected in parallel with a series circuit formed by the semiconductor switches 109, 111 and the associated freewheeling diodes 110 and 112. A DC link capacitor 106 is arranged in parallel with the two series circuits. The first terminal X1 is arranged at a potential point 113 between the semiconductor switches 102, 104, the second terminal X2 is arranged at a potential point 114 between the semiconductor switches 109, 111.

By means of a suitable control of the power semiconductors 102, 104, 109 and 111 the voltage dropped at the terminals X1, X2 can be generated, which corresponds either to the voltage Uc dropped across the DC link capacitor 106, the voltage dropped across the DC link capacitor 106 but with opposite polarity (−Uc), or to a voltage of zero.

The invention claimed is:

1. A system for stabilizing an AC voltage grid, the system comprising:
   a converter connected to the AC voltage grid via a transformer and configured for exchanging reactive power with the AC voltage grid, said converter connected to a converter-side winding of said transformer;
   an inductor configuration having variable inductor coils to be connected to the AC voltage grid at a grid-side winding of said transformer;
   a controller configured to control said converter and said inductor configuration to control the reactive power in the AC voltage grid; and
   said controller additionally configured to control said converter in such a way that switching voltage fluctuations arising in the AC voltage grid as a result of switching operations of said inductor configuration are at least partially compensated by said converter.

2. The system according to claim 1, wherein said controller is configured for controlling the reactive power by said converter and said inductor configuration, in such a way that during transient voltage fluctuations in the AC voltage grid the reactive power is controlled by said converter and in a stationary operating region of the AC voltage grid by said inductor configuration.

3. The system according to claim 1,
   further comprising a switch; and
   wherein said inductor configuration has variable inductor coils that are interconnected to form a star point, wherein each of said variable inductor coils is electrically connected at its opposite end to said star point and to said switch, by means of said switch said variable inductor coils are connected to a phase of the AC voltage grid associated thereto.

4. The system according to claim 1, further comprising a common switch, said inductor configuration and said converter being connected to the AC voltage grid by said common switch.

5. The system according to claim 1, further comprising switching configurations, said inductor configuration and said converter can each be connected to the AC voltage grid by means of separate ones of said switching configurations.

6. The system according to claim 1, wherein said converter is a modular multilevel converter.

7. The system according to claim 1, wherein said inductor configuration is configured for a power range between +−100 Mvar and +−300 Mvar.

8. The system according to claim 1, wherein said converter is configured for a power range between +−10 Mvar to +−400 Mvar.

9. A method for stabilizing an AC voltage grid by a system having a converter connected to the AC voltage grid via a transformer, a controller and an inductor configuration with variable inductor coils, which comprises the steps of:
   connecting the converter and the inductor configuration to the AC voltage grid, the converter being connected to the AC voltage grid at a converter-side winding of the transformer, the inductor configuration being connected to the AC voltage grid at a grid-side winding of the transformer; and
   controlling a reactive power in the AC voltage grid by using the controller to control the converter and the inductor configuration, the controller controlling the converter in such a way that switching voltage fluctuations arising in the AC voltage grid as a result of switching operations of the inductor configuration are at least partially compensated by said converter.

10. The method according to claim 9, wherein during transient voltage fluctuations in the AC voltage grid controlling the reactive power by means of the converter, and in a stationary operating range of the AC voltage grid by means of the inductor configuration.

11. A system for stabilizing an AC voltage grid, the system comprising:
   a converter connected to the AC voltage grid and configured for exchanging reactive power with the AC voltage grid;
   an inductor configuration having variable inductor coils to be connected to the AC voltage grid, inductance of said inductor configuration being adjustable by a step switch; and
   a controller configured to control said converter and said inductor configuration to control the reactive power in the AC voltage grid;
   said controller configured to control the reactive power by said converter and said inductor configuration in such a way that during transient voltage fluctuations in the AC voltage grid the reactive power is controlled by said converter, and in a stationary operating region of the AC voltage grid by said inductor configuration; and
   said controller additionally configured to control said converter in such a way that switching voltage fluctuations arising in the AC voltage grid as a result of switching operations of said inductor configuration are at least partially compensated by said converter.

* * * * *